United States Patent
Xiao et al.

(10) Patent No.: US 12,177,159 B2
(45) Date of Patent: Dec. 24, 2024

(54) METHOD AND APPARATUS FOR HARQ-ACK FEEDBACK IN MULTI-TRP TRANSMISSION

(71) Applicant: LENOVO (BEIJING) LIMITED, Beijing (CN)

(72) Inventors: Lingling Xiao, Beijing (CN); Bingchao Liu, Beijing (CN); Chenxi Zhu, Beijing (CN); Wei Ling, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 487 days.

(21) Appl. No.: 17/608,411

(22) PCT Filed: May 28, 2019

(86) PCT No.: PCT/CN2019/088792
§ 371 (c)(1),
(2) Date: Nov. 2, 2021

(87) PCT Pub. No.: WO2020/237502
PCT Pub. Date: Dec. 3, 2020

(65) Prior Publication Data
US 2022/0321305 A1    Oct. 6, 2022

(51) Int. Cl.
*H04W 4/00*      (2018.01)
*H04L 1/1812*    (2023.01)
*H04L 5/00*      (2006.01)

(52) U.S. Cl.
CPC .......... *H04L 5/0055* (2013.01); *H04L 1/1812* (2013.01)

(58) Field of Classification Search
CPC ... H04L 5/0055; H04L 1/1812; H04L 1/1864; H04L 5/0053; H04L 5/0078;
(Continued)

(56) References Cited

U.S. PATENT DOCUMENTS 11,831,438 B2 *  11/2023  Noh ............... H04L 1/1864
2020/0145167 A1 *  5/2020  Jung .............. H04L 5/0055
(Continued)

FOREIGN PATENT DOCUMENTS

| CN | 109474393 A | 3/2019 |
| CN | 109802749 A | 5/2019 |

(Continued)

OTHER PUBLICATIONS

International Searching Authority, "Written Opinion of the International Searching Authority," PCT/CN2019/088792, Jan. 22, 2020, pp. 1-3.

*Primary Examiner* — Phuongchau Ba Nguyen
(74) *Attorney, Agent, or Firm* — Kunzler Bean & Adamson

(57) ABSTRACT

Embodiments of the present application relate to methods and apparatuses for Hybrid Automatic Repeat Request-Acknowledge (HARQ-ACK) feedback in multi-Transmit-Receive Point (TRP) transmission. According to an embodiment of the present disclosure, a method can include: transmitting configuration information indicating at least one Physical Uplink Control Channel (PUCCH) resource set; indicating a PUCCH resource of the at least one PUCCH resource set via Downlink Control Information (DCI), wherein the indicated PUCCH resource is at least for carrying a HARQ-ACK; and detecting the HARQ-ACK at least on the indicated PUCCH resource. Embodiments of the present disclosure can increase the robustness of multi-TRP transmission.

19 Claims, 12 Drawing Sheets

(58) Field of Classification Search
CPC ... H04L 5/0094; H04L 1/1854; H04L 5/0007; H04W 28/04; H04W 72/04; H04W 72/042; H04W 88/08; H04W 28/08; H04W 28/084; H04W 36/22; H04W 72/12

See application file for complete search history.

(56) References Cited

U.S. PATENT DOCUMENTS

| | | | |
|---|---|---|---|
| 2020/0214006 A1* | 7/2020 | Choi | H04L 5/0048 |
| 2020/0266931 A1* | 8/2020 | Gou | H04L 27/2607 |
| 2021/0218519 A1* | 7/2021 | Gou | H04W 72/53 |
| 2021/0274494 A1* | 9/2021 | Feng | H04L 1/1896 |
| 2022/0085925 A1* | 3/2022 | Gao | H04L 5/0053 |
| 2022/0272669 A1* | 8/2022 | Xu | H04W 72/56 |
| 2023/0231662 A1* | 7/2023 | Gou | H04L 1/1854 370/329 |
| 2023/0231688 A1* | 7/2023 | Chen | H04L 1/1854 370/329 |

FOREIGN PATENT DOCUMENTS

| | | |
|---|---|---|
| CN | 109802783 A | 5/2019 |
| MY | 167993 A | 10/2018 |

\* cited by examiner

METHOD AND APPARATUS FOR HARQ-ACK FEEDBACK IN MULTI-TRP TRANSMISSION

TECHNICAL FIELD

Embodiments of the present application generally relate to wireless communication technology, especially to a method and an apparatus for Hybrid Automatic Repeat Request-Acknowledge (HARQ-ACK) feedback in multi-Transmit-Receive Point (multi-TRP) transmission.

BACKGROUND

Multi-TRP/panel transmission has been introduced into New Radio (NR) Release 16, and enhancements on Multiple-Input Multiple-Output (MIMO) for NR have been discussed, for example in RP-182067. According to RP-182067, one specific objective of the work item is to extend specification support in enhancements on multi-TRP/panel transmission including: improved reliability and robustness with both ideal and non-ideal backhaul, including: specifying downlink control signaling enhancement(s) for efficient support of non-coherent joint transmission; performing study and, if needed, specifying enhancements on uplink control signaling and/or reference signal(s) for non-coherent joint transmission; and multi-TRP techniques for Ultra Reliable Low Latency Communications (URLLC) requirements are included in this work item.

In addition, only a single TRP and a single panel with a single beam based Physical Uplink Control Channel (PUCCH) is supported in Rel-15. That is, only one PUCCH with HARQ-ACK feedback can be transmitted in a single slot. In 3rd Generation Partnership Project (3GPP) RAN1 96b #, multiple agreements about transmitting ACK/NACK for multiple TRPs were achieved. Separated HARQ-ACK targeting different TRPs using Time-Division Multiplexed (TDMed) PUCCH resources within a single slot will be supported in Rel-16.

Thus, there is a need for further complementing and improving technical solutions for transmitting a HARQ-ACK feedback in multi-TRP transmission scenarios.

SUMMARY OF THE APPLICATION

One objective of the embodiments of the present application is to provide a technical solution for supporting separated HARQ-ACK feedback on TDMed PUCCH resources in a single slot for multi-TRP with non-ideal backhaul.

According to an embodiment of the present application, a method may include: transmitting configuration information indicating at least one PUCCH resource set; indicating a PUCCH resource of the at least one PUCCH resource set via Downlink Control Information (DCI), wherein the indicated PUCCH resource is at least for carrying a HARQ-ACK; and detecting the HARQ-ACK at least on the indicated PUCCH resource.

According to another embodiment of the present application, a method may include: receiving information on a first indicated PUCCH resource at least for carrying a first HARQ-ACK via first DCI, receiving information on a second indicated PUCCH resource at least for carrying a second HARQ-ACK via second DCI, and transmitting at least one of the first HARQ-ACK and the second HARQ-ACK.

Some embodiments of the present application also provide an apparatus, include: at least one non-transitory computer-readable medium having computer executable instructions stored therein, at least one receiver; at least one transmitter; and at least one processor coupled to the at least one non-transitory computer-readable medium, the at least one receiver and the at least one transmitter. The computer executable instructions are programmed to implement any method as stated above with the at least one receiver, the at least one transmitter and the at least one processor.

Embodiments of the present application provide a technical solution for HARQ-ACK feedback in multi-TRP transmission. Accordingly, embodiments of the present application can increase the robustness of multi-TRP transmission in a communication network, and facilitate the deployment and implementation of the NR.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application, and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

In a wireless communication system, there may be at least one TRP. A TRP acts like a small base station. Multiple TRPs may communicate with each other using a backhaul. Such backhaul may be an ideal backhaul or a non-ideal backhaul. Latency of the ideal backhaul may be deemed as zero, and latency of the non-ideal backhaul may be tens of milliseconds and much larger, e.g. on the order of tens of milliseconds, than that of the ideal backhaul. Each TRP can be used to serve one or more User Equipment (UE) under the control of a base station. In different application scenario, a TRP may be described using different terms. In fact, in some application scenarios, for example, in a scenario of Coordinated Multi-Point (CoMP), the TRP can even be a base station. Persons skilled in the art should understand that as the 3GPP and the communication technology develop, the terminologies recited in the specification may change, which should not affect the scope of the present application.

Figure 1:
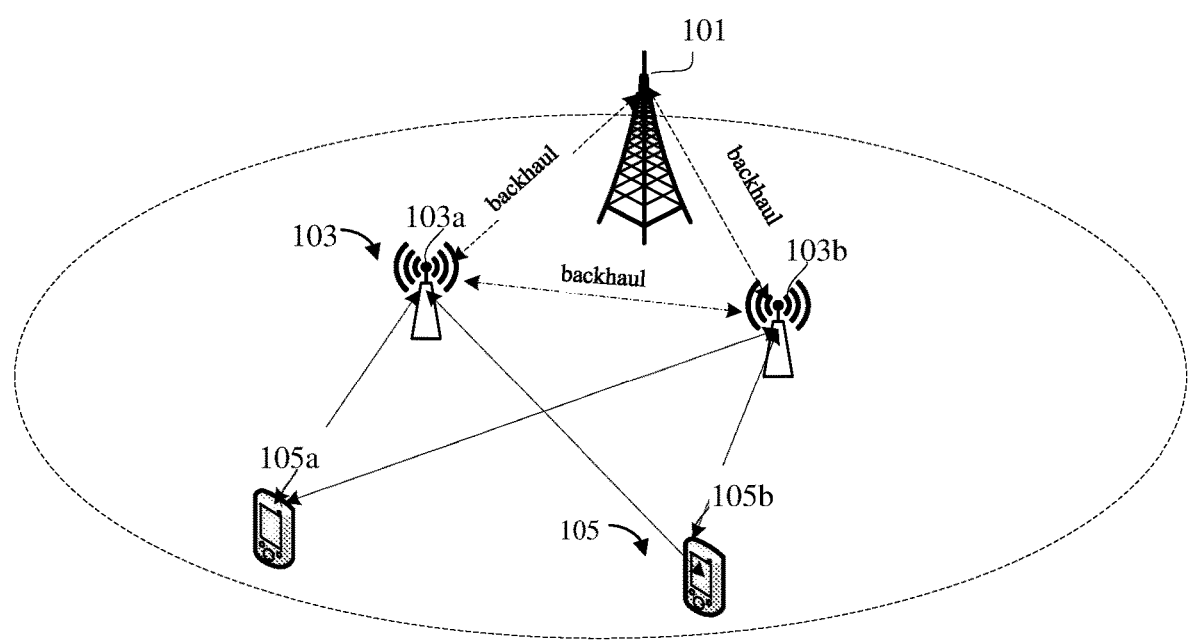
FIG. 1 is a schematic diagram illustrating an exemplary wireless communication system including at least one TRP according to an embodiment of the present application.

FIG. 1 is a schematic diagram illustrating an exemplary wireless communication system 100 including at least one TRP 103 according to an embodiment of the present application.

Specifically, as shown in FIG. 1, a wireless communication system 100 includes one base station 101, two TRPs 103, e.g., a first TRP 103a and a second TRP 103b, and two UEs 105, e.g., a first UE 105a and a second UE 105b. Although only one base station 101, two TRPs 103 and two UEs 105 are shown for simplicity, it should be noted that the wireless communication system 100 may further include more base stations 101, TRPs 103, and UEs 105. The base station 101 may be a gNB in some application scenarios. The TRPs 103, for example, the first TRP 103a and the second TRP 103b may be connected to the same or different base stations 101, for example using a backhaul. Each TRP 103 may also serve a number of UEs 105. As an example, both the first TRP 103a and the second TRP 103b may serve a number of mobile stations including the first UE 105a and the second UE 105b within a serving area, for example, a cell or a cell sector. The first TRP 103a and the second TRP 103b can also communicate with each other, for example via a backhaul. Either or both of the first UE 105a and the second UE 105b may represent a computing device, a wearable device, or a mobile device, etc.

In addition, HARQ-ACK feedback technology is commonly used during data transmission, to provide feedback on whether data was correctly received in the downlink (DL) or uplink (UL) transmission. HARQ-ACK represents collectively the positive Acknowledgement (ACK) and the Negative Acknowledgement (NACK). ACK/NACK is important Uplink Control Information (UCI) information in a multi-TRP transmission, wherein ACK means data was correctly received while NACK means data was erroneously received or missing.

Meanwhile, flexible Physical Uplink Control Channel (PUCCH) resource allocation has been introduced into 5G wireless communication technology. A single PUCCH resource can carry a HARQ-ACK associated with a downlink transmission, for example a Physical Downlink Shared Channel (PDSCH) is specified in TS 38.213. In accordance with NR Rel-15, a UE 105 can be configured with up to four PUCCH resource sets with each PUCCH resource set being configured by higher layer signaling to contain a plurality of PUCCH resources. Meanwhile, each PUCCH resource set is configured with a parameter which denotes the maximum number of UCI information bits that a UE 105 can transmit on a PUCCH resource in the PUCCH resource set.

However, a UE 105 cannot transmit more than one PUCCH resource containing HARQ-ACK information within a single slot in Rel-15. For a PUCCH transmission carrying HARQ-ACK information, a UE 105 will first determine a PUCCH resource set based on the HARQ-ACK information bits to be transmitted and then, determine a specific PUCCH resource from the PUCCH resource set utilizing, for example, a PUCCH resource indicator received in the corresponding DCI and the first Control Channel Element (CCE) for the specific PDCCH resource. Thus, a UE 105 can timely transmit HARQ-ACK for only one TRP 103 in multi-TRP transmission. For HARQ-ACK targeting another TRP 103, the UE 105 has to transmit it at a later time or directly drop it.

To improve reliability and robustness in multi-TRP with both ideal and non-ideal backhaul, transmission of separated HARQ-ACK in a single slot is expected. In a multi-TRP transmission scenario with ideal backhaul between different TRPs 103, different TRPs 103 can coordinate dynamically to ensure that PUCCH resources used to transmit a HARQ-ACK to different TRPs 103 are not overlapped in the same slot. However, for a multi-TRP transmission scenario with non-ideal backhaul supported between different TRPs 103, dynamic coordination cannot be achieved. Accordingly, a PUCCH resources indicated by independent Downlink Control Information (DCI) received by UE 105 from different TRPs 103 for HARQ-ACK transmission may be overlapped in time domain.

Embodiments of the present application can provide technical solutions at least solving the above technical problems. More details on the embodiments of the present application will be illustrated in the following text in combination with the appended drawings.

According to some embodiments of the present application, a group of PUCCH resources can be configured via high layer signaling for each TRP 103, and the group of PUCCH resources can include at least one PUCCH resource set configured for PUCCH HARQ-ACK transmission from a UE 105 to the corresponding TRP 103. For example, the high layer may represent a layer higher than the physical (PHY) layer, such as Media Access Control (MAC) layer a Radio Resource Control (RRC) layer. According to some other embodiments of the present application, a group of PUCCH resources can be configured for sharing between different TRPs 103, and the group of PUCCH resources can include at least one PUCCH resource set configured for PUCCH transmission from a UE 105 to the different TRPs 103.

In some embodiment of the present application, a UE 105 can be configured with up to four PUCCH resource sets. A PUCCH resource set is configured by higher layer signaling and contains a plurality of PUCCH resources. Each PUCCH resource set is configured with a parameter which denotes the maximum number of UCI information bits that a UE 105 can transmit on a PUCCH resource in the PUCCH resource set.

Each PUCCH resource in one PUCCH resource set has its own start symbol, duration, PUCCH format etc., wherein the duration means the number of symbols that a PUCCH resource occupied. Five different PUCCH formats have been defined in NR Rel-15, wherein PUCCH format 0 and format 2 can have up to 2 symbols and PUCCH format 1, PUCCH format 3 and PUCCH format 4 can have 4 to 14 symbols. Accordingly, a PUCCH resource in PUCCH format 0 and 2 can transmit up to 2 bit UCI including at least one of HARQ-ACK and Scheduling Request (SR), while a PUCCH resource in PUCCH format 1, PUCCH format 3 and PUCCH format 4 can transmit at least 4 bit UCI including at least one of HARQ-ACK, SR and CSI (Channel State Information). For simplicity, a PUCCH resource in format 0 or 2 can also be named as a "short PUCCH resource," while a PUCCH resource in format 1, 3 or 4 can also be named as a "long PUCCH resource."

A detection window for HARQ-ACK detection can also be configured for each TRP 103 via a higher layer signal, and the detection window for different TRPs cannot be overlapped with each other in the time domain. The detection window is represented by N successive symbols in a slot. For example, the detection window can be first N symbols or last N symbols in a slot, and N is larger than one and smaller than a total number of the symbols in the slot.

Figure 2:
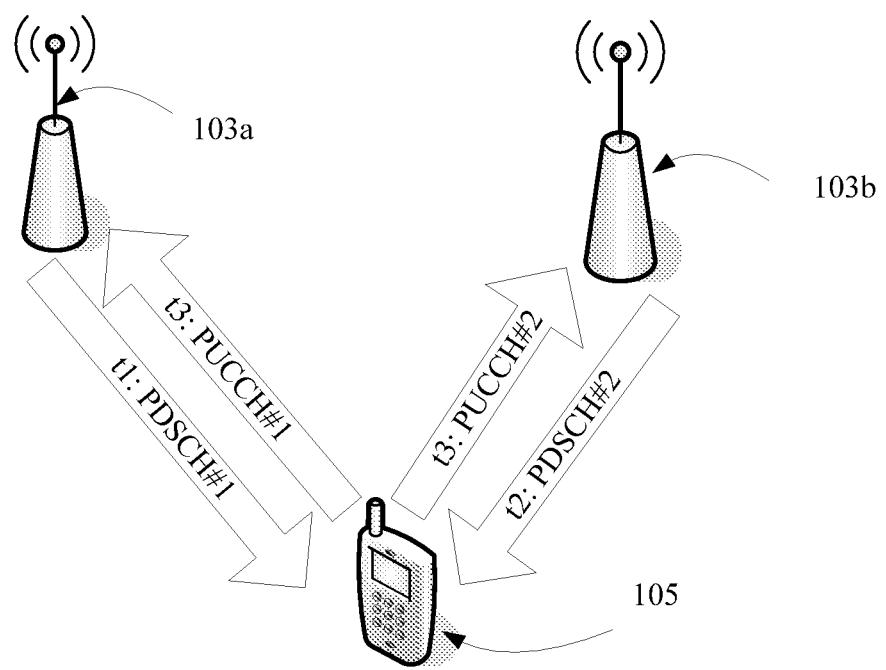
FIG. 2 illustrates a scenario on separate HARQ-ACK feedback in multi-TRP transmission with non-ideal backhaul according to some embodiments of the present application.

FIG. 2 illustrates a scenario of separated HARQ-ACK feedback in multi-TRP transmission with non-ideal backhaul according to some embodiments of the present application, wherein HARQ-ACKs targeting two TRPs are to be transmitted from a single UE 105 in the same slot. The scenario depicted in FIG. 2 may be a specific scenario of the wireless communication system 100 shown in FIG. 1 or other wireless communication system with multi-TRP transmission.

As shown in FIG. 2, two TRPs, for example the first TRP 103a and the second TRP 103b in FIG. 1, and one UE 105, for example the first UE 105a or the second UE 105b in FIG. 1 are illustrated. As persons skilled in the art can understand, the two TRPs can be other TRPs in the wireless communication system 100, or other TRPs in other wireless communication system according to embodiments of the present application.

UE 105 can be configured with at least one PUCCH resource set to support PUCCH transmission to the first TRP 103a, and with also at least one PUCCH resource set to support PUCCH transmission to the second TRP 103b. A PUCCH resource set can contain multiple PUCCH resources. In some embodiments of the present application, only one PUCCH resource set is configured and HARQ-ACK targeting different TRPs can be transmitted by different PUCCH resources in the set. In some other embodiments of the present application, multiple PUCCH resource sets are configured and HARQ-ACK targeting different TRPs can be transmitted by respective PUCCH resources in different PUCCH resource sets. Accordingly, the at least one PUCCH resource set configured for the first TRP 103a and the at least one PUCCH resource set configured for the second TRP 103b can be different or the same. For example, in some embodiments of the present application, at least one PUCCH resource set can be configured to support PUCCH transmission between the UE 105 and both the first TRP 103a and the second TRP 103b.

A first TRP 103a can have a first detection window for HARQ-ACK detection configured via a high layer signaling, and the second TRP 103b can have a second detection window for HARQ-ACK detection configured via a high layer signaling. For example, the high layer may represent a layer higher than the PHY layer, such as MAC layer a RRC layer. According to embodiments of the present application, a detection window is N symbols in a slot, and N is larger than one and smaller than a total number of the symbols in the slot. For example, a detection window can be first N symbols or last N symbols in a slot. The first detection window and the second detection window are within a same slot but not overlapped in time domain. Accordingly, one of the first and second detection windows can be N1 symbols in a slot and the other of the first and second detection windows can be N2 symbols in the slot, N1 and N2 are larger than one and smaller than the total number of the symbols in the slot. For example, the first detection window can be first N1 symbols in a slot, while the second detection window can be last N2 symbols in the slot.

Figure 3:
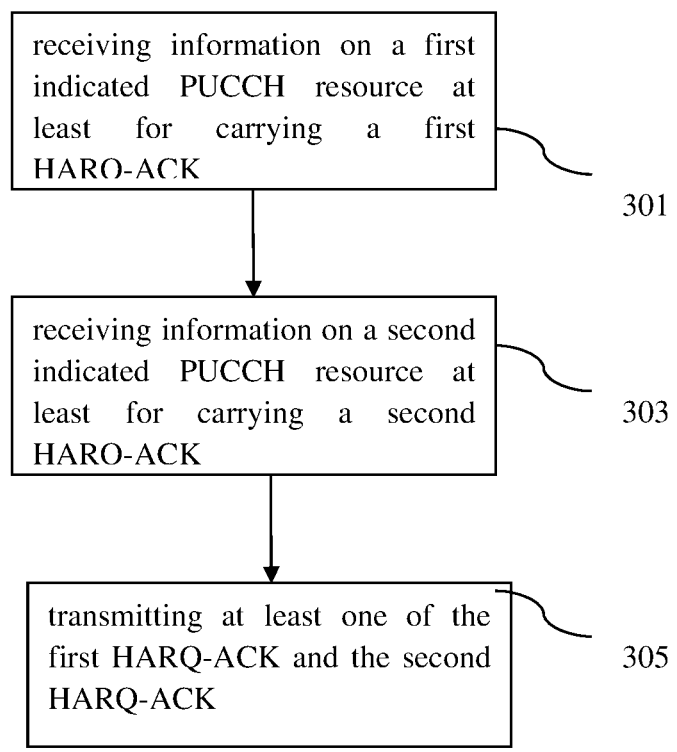
FIG. 3 is a flow chart illustrating a method for HARQ-ACK feedback in multi-TRP transmission according to some embodiments of the present application.
Figure 4:
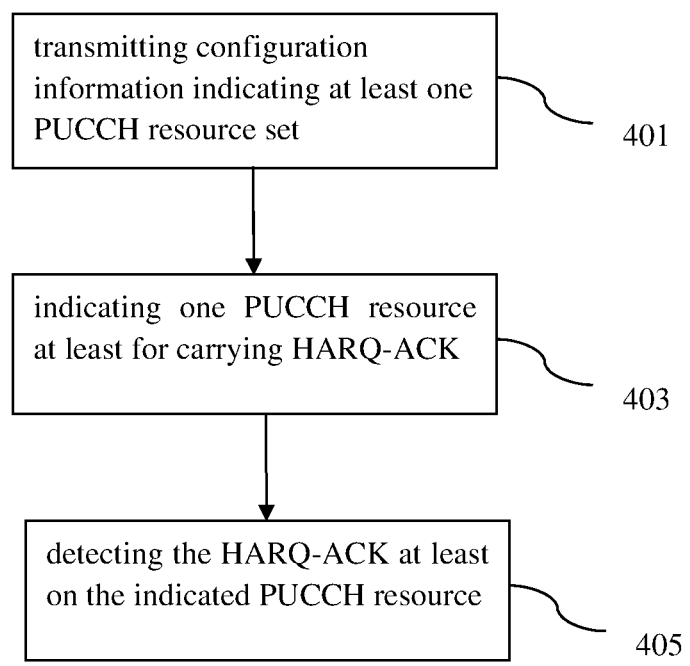
FIG. 4 is a flow chart illustrating a method for HARQ-ACK feedback in multi-TRP transmission according to some other embodiments of the present application.

As shown in FIG. 2, at time t1, a first TRP 103a can transmit a first downlink transmission, for example PDSCH #1 to UE 105 and at time t2, a second TRP 103b can transmit a second downlink transmission, for example PDSCH #2 to the same UE 105. Then, at time t3, the UE 105 is required to transmit a first HARQ-ACK to the first TRP 103a in a PUCCH resource indicated by the first TRP 103a, for example PUCCH resource #1. In the same slot, i.e., t3, the UE 105 is required to transmit a second HARQ-ACK to the second TRP 103b in a PUCCH resource indicated by the second TRP 103b, for example PUCCH resource #2. According to embodiments of the present application, different strategies can be applied to solve the technical problem concerning how to transmit the first HARQ-ACK and second HARQ-ACK in the same slot. FIG. 3 and FIG. 4 illustrate a basic solution implemented on a UE and a TRP sides, respectively, according to some embodiments of the present application.

Specifically, FIG. 3 is a flow chart illustrating a method for HARQ-ACK feedback in multi-TRP transmission according to some embodiments of the present application. Although FIG. 3 is illustrated in view of the scenario shown in FIG. 2, it can be adaptive to other scenarios according to other embodiments of the present application.

As shown in FIG. 3, in step 301, information on a first indicated PUCCH resource at least for carrying a first HARQ-ACK is received, for example by UE 105. In step 303, information on a second indicated PUCCH resource at least for carrying a second HARQ-ACK is received, for example by the UE 105. In some embodiments of the present application, the first indicated PUCCH resource can be dynamically indicated by a corresponding TRP 103, e.g., the first TRP 103a to a UE 105, for example via first DCI. The second indicated PUCCH resource can be dynamically indicated by a corresponding TRP 103, e.g., the second TRP 103b to a UE 105, for example via second DCI.

According to some embodiments of the present application, in step 305, at least one of the first HARQ-ACK and the second HARQ-ACK can be transmitted by the UE 105. The HARQ-ACK can be transmitted on the corresponding indicated PUCCH resource or a reselected PUCCH resource.

Specifically, in some embodiments of the present application, the UE 105 can make determinations on the two HARQ-ACK transmissions at least based on the information related to the first and the second indicated PUCCH resources. The determination may include whether transmit the two HARQ-ACKs in a slot or only transmit one HARQ-ACK in a slot; and whether the HARQ-ACK is to be transmitted on the indicated PUCCH resource or a reselected PUCCH resource etc. More details on determination solutions will be illustrated in the following embodiments of the present application.

In some embodiments of the present application, the configuration information for PUCCH resources can also be received in UE 105 via higher layer signaling and can include at least one PUCCH resource set and detection window, as stated above, which the UE 105 can use for the PUCCH transmission between the UE 105 and the first TRP 103*a* and the second TRP 103*b*. In the case that an indicated PUCCH resource for a TRP 103 is a long PUCCH resource, i.e., in PUCCH format 1, PUCCH format 3, or PUCCH format 4, and the reselected PUCCH resource for the TRP 103 is also a long PUCCH resource; the configured PUCCH resource set including the indicated PUCCH resource must include a PUCCH resource in format 1, 3, or 4, and with the maximum capacity within the detection window for the TRP 103. The capacity of a PUCCH resource means a maximum number of UCI information bits that a UE can transmit using the PUCCH resource. In the case that an indicated PUCCH resource for TRP 103 is a long PUCCH resource, i.e., in format 1, 3, or 4, while the reselected PUCCH resource for the TRP 103 is a short PUCCH resource; the configured PUCCH resource set including the indicated PUCCH resource must include a PUCCH resource in format 0 or 2, and with the maximum capacity within the detection window of the TRP 103 that can provide at least one suitable PUCCH resource for being reelected by the UE 105 as expected.

FIG. 4 is a flow chart illustrating a method for HARQ-ACK feedback in multi-TRP transmission according to some other embodiments of the present application. Although FIG. 4 is illustrated in view of the scenario shown in FIG. 2, it can be adaptive to other scenarios according to some embodiments of the present application.

As shown in FIG. 4, in step 401, configuration information indicating at least one PUCCH resource set as stated above can be transmitted to a UE 105, for example by a TRP 103.

In step 403, one PUCCH resource of the at least one PUCCH resource set can be indicated to the UE 105 via DCI. The indicated PUCCH resource is at least for carrying HARQ-ACK associated with a downlink transmission from the TRP 103.

After transmitting the downlink transmission, for example a PDSCH, the TRP 103 may determine whether a re-transmission of the corresponding downlink transmission is necessary based on the HARQ-ACK received from the UE side. In step 405, the TRP 103 can detect a HARQ-ACK at least on the indicated PUCCH resource so that the TRP 103 can make the determination on re-transition.

According to some embodiments of the present application, in the case of indicating a PUCCH resource at least for carrying HARQ-ACK in PUCCH format 0 or format 2, the TRP can only indicate the short PUCCH resource being within its own corresponding detection window. Thus, in the case that both the first and second indicated PUCCH resource are in PUCCH format 0 or format 2, they cannot be overlapped due to not-overlapped detection windows. The UE 105 can transmit the first HARQ-ACK on the first indicated PUCCH resource and the second HARQ-ACK on the second indicated PUCCH resource in a single slot. However, in the case that one or both of PUCCH resources of the two HARQ-ACKs are in PUCCH format 1, 3 or 4, the first indicated PUCCH resource and the second indicated PUCCH resource may overlap. The UE 105 has to make a determination on how to handle these two HARQ-ACK feedbacks in the same slot. In this case, various solutions are provided considering the format of the indicated PUCCH resource according to embodiments of the present application.

Only One Indicated Pucch Resource is in Pucch Format 1, 3 or 4

According to some embodiments of the present application, in the case that one indicated PUCCH resource is a short PUCCH resource, and the other indicated PUCCH resource is a long PUCCH resource; the HARQ-ACK feedback associated with the indicated short PUCCH resource and the HARQ-ACK feedback associated with the indicated long PUCCH resource can be transmitted on the same slot. The HARQ-ACK feedback associated with the indicated short PUCCH resource can be transmitted on the indicated short PUCCH resource, while the HARQ-ACK feedback associated with the indicated long PUCCH resource can be transmitted on the indicated long PUCCH resource or a reselected long PUCCH.

Figure 5:
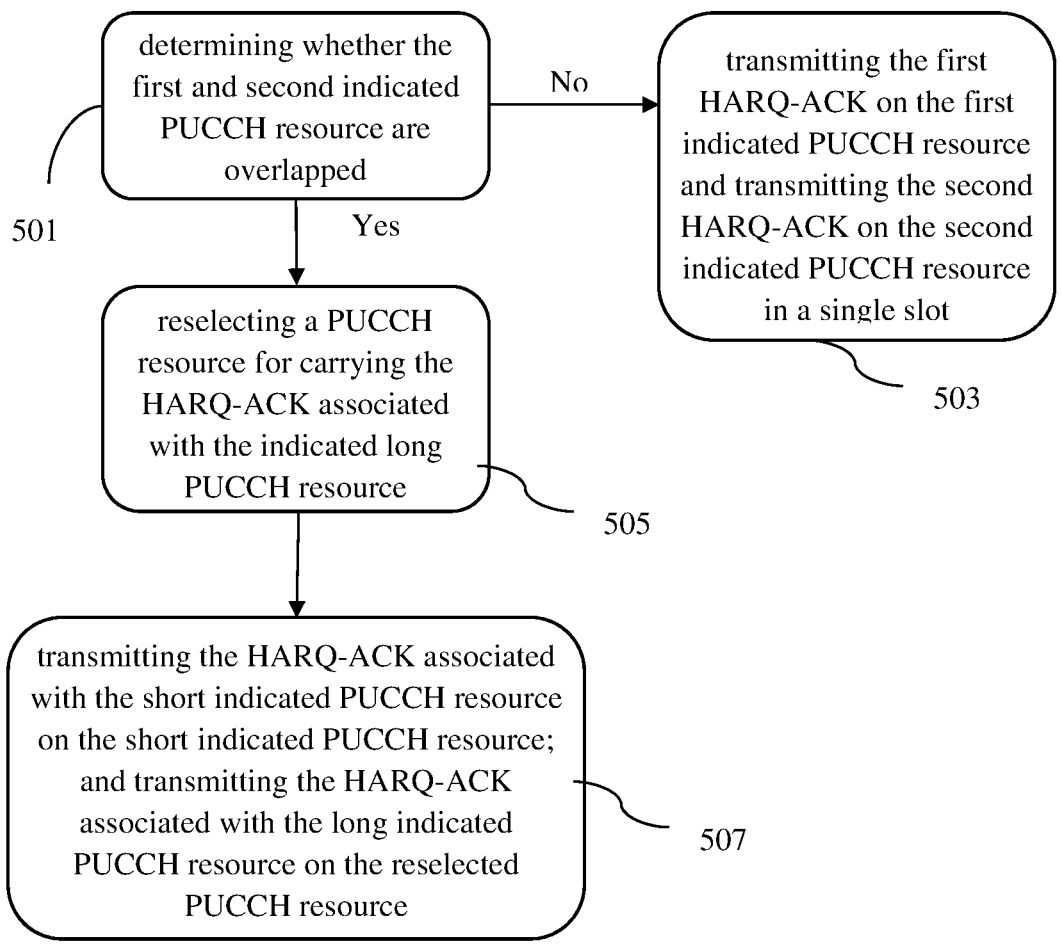
FIG. 5 is a flow chart illustrating a method for HARQ-ACK feedback in multi-TRP in the case that only one indicated PUCCH resource is in PUCCH format 1, PUCCH format 3, or PUCCH format 4 according to some embodiments of the present application.

FIG. 5 is a flow chart illustrating a method for HARQ-ACK feedback in multi-TRP scenario in the case that only one indicated PUCCH resource is in PUCCH format 1, PUCCH format 3 or PUCCH format 4 according to some embodiments of the present application. Although FIG. 5 is illustrated in view of the scenario shown in FIG. 2, it can be adaptive to other scenarios according to embodiments of the present application.

As shown in FIG. 5, in step 501, whether the first and second indicated PUCCH resource are overlapped can be determined (or checked), for example by the UE 105. In the case that the first and second indicated PUCCH resource are not overlapped, the first HARQ-ACK can be transmitted on the first indicated PUCCH resource and the second HARQ-ACK can be transmitted on the second indicated PUCCH resource in a single slot, in step 503. In the case that the first and second indicated PUCCH resource do overlapped, the UE 105 can reselect a PUCCH resource for carrying the HARQ-ACK associated with the indicated long PUCCH resource in step 505. The reselected PUCCH resource is also in format 1, 3, or 4, i.e., a long indicated PUCCH resource. In step 507, the UE 105 can transmit the HARQ-ACK associated with the indicated PUCCH resource in format 0, or 2, i.e., the short indicated PUCCH resource on the indicated short PUCCH resource in a slot. In the same slot, the UE 105 can transmit the HARQ-ACK associated with the long indicated PUCCH resource on the reselected PUCCH resource.

According to some embodiments of the present application, the reselected PUCCH resource is in the same PUCCH resource set as the corresponding indicated PUCCH resource, and the capacity of the reselected PUCCH resource is larger than or equal to the information bits of the HARQ-ACK to be transmitted. In the case that the same PUCCH resource set includes a plurality of PUCCH resources satisfying the above conditions, that is, in the case that a plurality of PUCCH resources on the same PUCCH resource set have a capacity larger than or equal to the information bits of the associated HARQ-ACK and are within the detection window; the earliest start symbol of the plurality of PUCCH resources can be selected by the UE 105 to transmit the associated HARQ-ACK. In the case that more than one of the plurality of PUCCH resources have the earliest start symbol, a PUCCH resource with the earliest start symbol and longest duration of the plurality of PUCCH resources can be determined being the reselected PUCCH resource.

For example, according to an embodiment of the present application, the first indicated PUCCH resource is in PUCCH format 0 or 2, and the second indicated PUCCH resource is in PUCCH format 1, 3, or 4. In the case that the first and second indicated PUCCH resource are overlapped, the UE 105 can reselect a long PUCCH resource within the second detection window from the same PUCCH resource set as the second indicated PUCCH resource to at least carry the second HARQ-ACK. The reselected long PUCCH resource within the second detection window should have a capacity larger than or equal to the information bits of the second HARQ-ACK. In a case that there are a plurality of PUCCH resources being within the second detection window and having a capacity larger than or equal to the information bits of the second HARQ-ACK in the same PUCCH resource set, the UE 105 can check the start symbol of plurality of PUCCH resources and determine the PUCCH resource with the earliest start symbol being the reselected PUCCH resource. In the case that more than one of the plurality of PUCCH resources have the same earliest start symbol, the UE 105 can determine the PUCCH resource with the earliest start symbol and longest duration being the reselected PUCCH resource.

According to some other embodiments of the present application, the capacity of the reselected PUCCH resource can be required based on that of the associated indicated PUCCH resource, rather than the information bits of the associated HARQ-ACK. Specifically, the reselected PUCCH resource is in the same PUCCH resource set as the corresponding indicated PUCCH resource, and the capacity of the reselected PUCCH resource is larger than or equal to that of the associated indicated PUCCH resource. In the case that the same PUCCH resource set includes a plurality of PUCCH resources satisfying the above conditions, that is, in the case that a plurality of PUCCH resources in the same PUCCH resource set have a capacity larger than or equal to that of the associated indicated PUCCH resource and are within the detection window; the earliest start symbol of the plurality of PUCCH resources can be selected by the UE 105 to transmit the associated HARQ-ACK. In the case that more than one of the plurality of PUCCH resources have the earliest start symbol, a PUCCH resource with the earliest start symbol and longest duration of the plurality of PUCCH resources can be determined being the reselected PUCCH resource.

Accordingly, on the TRP side, each TRP 103 can detect the HARQ-ACK on the indicated PUCCH resource. For the TRP 103 indicating a short PUCCH resource, e.g., the first TRP 103*a*, it can only detect the HARQ-ACK on the indicated PUCCH resource. For the TRP 103 indicating a long PUCCH resource, e.g., the second TRP 103*b*, in the case that no HARQ-ACK being detected on the indicated long PUCCH resource, the TRP 103 can detect the HARQ-ACK on another PUCCH resource, i.e., the PUCCH resource reselected by the UE within the detection window. The TRP 103 can determine another PUCCH resource to be detected based on the same rules by which the UE 105 used to determine the reselected PUCCH resource.

Figure 6:
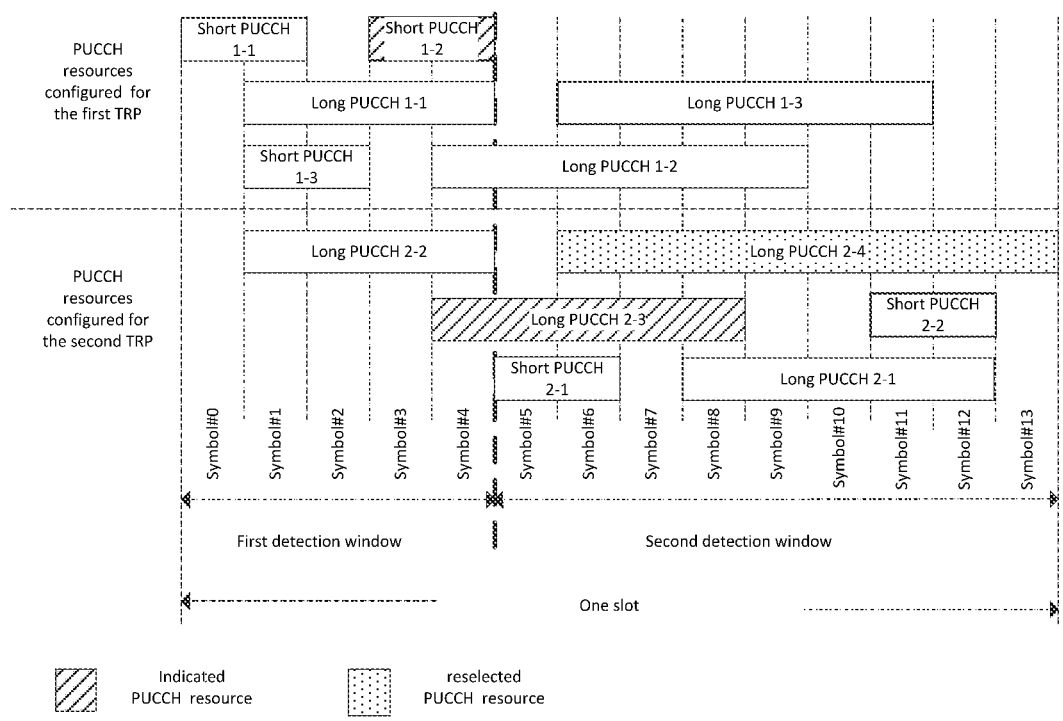
FIG. 6 illustrates an example of PUCCH reselection for HARQ-ACK feedback in multi-TRP transmission in an exemplary scenario with only one indicated PUCCH resource in PUCCH format 1, PUCCH format 3 or PUCCH format 4 according an embodiment the present application.

An exemplary embodiment of the method shown in FIG. 5 can be illustrated in view of FIG. 6. FIG. 6 illustrates an example of PUCCH reselection for HARQ-ACK feedback in multi-TRP transmission in an exemplary scenario with only one indicated PUCCH resource in PUCCH format 1, PUCCH format 3, or PUCCH format 4 according an embodiment the present application.

As shown in FIG. 6, three short PUCCH resources, i.e., short PUCCH 1-1, short PUCCH 1-2, and short PUCCH 1-3 are configured for the first TRP 103*a*. Three long PUCCH resources, i.e., long PUCCH 1-1, long PUCCH 1-2, and long PUCCH 1-3 can also be configured for the first TRP 103*a*. All the three short PUCCH resources and one long PUCCH resource, i.e., long PUCCH 1-1 are within the first detection window of the first TRP 103, which is first 5 symbols in the slot as shown. Also, the capacity of each configured PUCCH resource is larger than or equal to the information bits of the first HARQ-ACK to be transmitted to the first TRP 103*a*. For example, to at least receive the HARQ-ACK from a UE 105, the first TRP 103*a* can indicate a short PUCCH resource of the configured PUCCH resources, e.g., short PUCCH 1-2 to the UE 105 via DCI.

Similarly, two short PUCCH resources, i.e., short PUCCH 2-1 and short PUCCH 2-2 are configured for the second TRP 103*b*, for example by a gNB or a TRP 103. Four long PUCCH resources, i.e., long PUCCH 2-1, long PUCCH 2-2, long PUCCH 2-3 and long PUCCH 2-4 can also be configured for the second TRP 103*b*, for example by a gNB or a TRP 103. All the short PUCCH resources and two long PUCCH resources, i.e., long PUCCH 2-1 and long PUCCH 2-4 are within the detection window of the second TRP 103*b*, which is last 9 symbols in the slot as shown. Similarly, the capacity of each configured PUCCH resource is larger than or equal to the information bits of the second HARQ-ACK targeting the second TRP 103*b*. For at least receiving the HARQ-ACK from the UE 105, the second TRP 103*b* can indicate a long PUCCH resource of the configured PUCCH resources, e.g., long PUCCH 2-3 to the UE 105 via DCI.

Based on the received information, the UE 105 can determine that the two indicated PUCCH resources, i.e., short PUCCH 1-2 for the first TRP 103*a* and long PUCCH 2-3 for the second TRP 103*b* are overlapped in a slot. Since the indicated PUCCH resource for the first TRP 103*a* is a short PUCCH resource within the first detection window, the UE 105 can directly transmit the first HARQ-ACK on the short PUCCH 1-2. For the indicated PUCCH resource for the second TRP 103*b*, the UE 105 will select another long PUCCH resource in the last 9 symbols of the slot for carrying the second HARQ-ACK. The capacity of the reselected long PUCCH resource should be larger than or equal to the information bits of the second HARQ-ACK. Both long PUCCH 2-1 and long PUCCH 2-4 are in the last 9 symbols and have the capacity larger than or equal to the information bits of the second HARQ-ACK. Considering the start symbol of long PUCCH 2-4 being earlier than long PUCCH 2-1, the UE 105 will identify long PUCCH 2-4 as the reselected PUCCH resource at least for carrying the second HARQ-ACK.

Accordingly, the first TRP 103*a* will only detect HARQ-ACK on the indicated PUCCH resource, i.e., short PUCCH 1-2. On the other hand, the second TRP 103*b* will first try to detect HARQ-ACK on the indicated PUCCH resource, i.e., long PUCCH 2-3. Due to no HARQ-ACK being detected on the indicated PUCCH resource, the second TRP 103*b* will try to detect the HARQ-ACK on another long PUCCH resource. According to the same rule as that for determining the reselected PUCCH resource, the second TRP 103*b* can determine another long PUCCH resource to be the long PUCCH 2-4 and then proceed to detect the HARQ-ACK on the long PUCCH 2-4.

Both Indicated Pucch Resources are in Pucch Format 1, 3 or 4

According to some embodiments of the present application, in the case that both indicated PUCCH resources are long PUCCH resources, i.e., in PUCCH format 1, 3, or 4; a UE 105 can either transmit HARQ-ACK associated with the two indicated PUCCH resources in the same slot or transmit HARQ-ACK associated with only one of the two indicated PUCCH resources in a slot.

Figure 7:
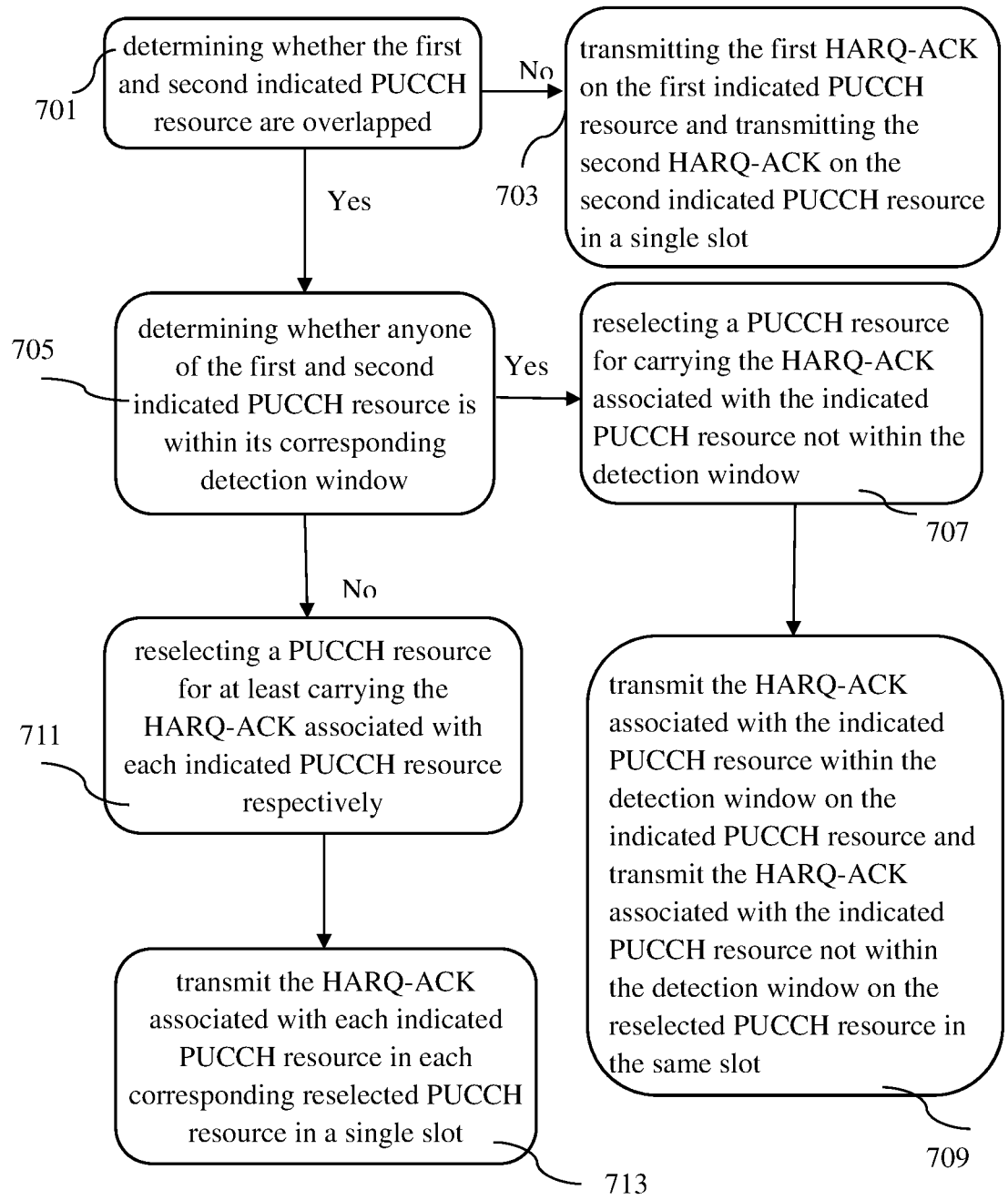
FIG. 7 is a flow chart illustrating a method for HARQ-ACK feedback in multi-TRP in the case that two indicated PUCCH resources are in PUCCH format 1, PUCCH format 3 or PUCCH format 4 according to some embodiments of the present application.

FIG. 7 is a flow chart illustrating a method for HARQ-ACK feedback in multi-TRP scenario in the case that two indicated PUCCH resources are in PUCCH format 1, 3, or 4 according to some embodiments of the present application. Although FIG. 7 is illustrated in view of the scenario shown in FIG. 2, it can be adaptive to other scenarios according to embodiments of the present application.

As shown in FIG. 7, in the case that the two indicated PUCCH resources are long PUCCH resources, whether the first and second indicated PUCCH resource are overlapped can be firstly determined (or checked) in step 701, for example by the UE 105. In the case that the first and second indicated PUCCH resources are not overlapped, the first HARQ-ACK can be transmitted in the first indicated PUCCH resource and the second HARQ-ACK can be transmitted in the second indicated PUCCH resource in a single slot, in step 703.

In the case that the first and second indicated PUCCH resource do overlap, in step 705, the UE 105 can determine which of the first and second indicated PUCCH resources is within its corresponding detection window. In case that one of the first and second indicated PUCCH resources is within the detection window of the associated TRP 103, the UE 105 can reselect a PUCCH resource for carrying the HARQ-ACK associated with the indicated PUCCH resource not within the detection window in step 707. The reselected PUCCH resource is also in PUCCH format 1, 3, or 4, i.e. a long indicated PUCCH resource, and is now within the corresponding detection window. In step 709, the UE 105 can transmit the HARQ-ACK associated with the indicated PUCCH resource within the detection window on the indicated PUCCH resource within a slot. In the same slot, the UE 105 can transmit the HARQ-ACK associated with the indicated PUCCH resource not within the detection window on the reselected PUCCH resource.

For example, in the case that the first indicated PUCCH resource is within the first detection window, and the second indicated PUCCH resource is not within the second detection window; the UE 105 can transmit the first HARQ-ACK on the first indicated PUCCH resource in a slot, and transmit the second HARQ-ACK on a reselected PUCCH resource within the second detection window in the same slot, wherein the reselected PUCCH resource is in PUCCH format 1, PUCCH format 3, or PUCCH format 4 and is in the same PUCCH resource set as the second indicated PUCCH resource.

According to some embodiments of the present application, the reselected PUCCH resource is in the same PUCCH resource set as the corresponding indicated PUCCH resource, and the capacity of the reselected PUCCH resource is larger than or equal to the information bits of the associated HARQ-ACK. In the case that the same PUCCH resource set includes a plurality of PUCCH resources satisfying the above conditions, that is, in the case that a plurality of PUCCH resources in the same PUCCH resource set have a capacity larger than or equal to the information bits of the associated HARQ-ACK and are within the detection window; the earliest start symbol of the plurality of PUCCH resources can be selected by the UE 105 to transmit the associated HARQ-ACK. In the case that more than one of the plurality of PUCCH resources have the earliest start symbol, a PUCCH resource with the earliest start symbol and longest duration of the plurality of PUCCH resources can be determined being the reselected PUCCH resource.

According to some other embodiments of the present application, the reselected PUCCH resource is in the same PUCCH resource set as the corresponding indicated PUCCH resource, and the capacity of the reselected PUCCH resource is larger than or equal to that of the associated indicated PUCCH resource. In the case that the same PUCCH resource set includes a plurality of PUCCH resources satisfying the above conditions, that is, in the case that a plurality of PUCCH resources in the same PUCCH resource set have a capacity larger than or equal to that of the associated indicated PUCCH resource and are within the detection window; the earliest start symbol of the plurality of PUCCH resources can be selected by the UE 105 to transmit the associated HARQ-ACK. In the case that more than one of the plurality of PUCCH resources have the earliest start symbol, a PUCCH resource with the earliest start symbol and longest duration of the plurality of PUCCH resources can be determined being the reselected PUCCH resource.

In the case that neither the first indicated PUCCH resource nor the second indicated PUCCH resource is within the detection window, in step 711, the UE 105 can reselect a PUCCH resource carrying the HARQ-ACK associated with each indicated PUCCH resource respectively. Both the first and second reselected PUCCH resources are determined under the same rules as stated above, for example being in format 1, 3, or 4, i.e., a long indicated PUCCH resource, and are within its corresponding detection window etc. In step 713, the UE 105 can transmit the HARQ-ACK associated with each indicated PUCCH resource in each corresponding reselected PUCCH resource in a single slot.

For example, in the case that the first indicated PUCCH resource is not within the first detection window, and the second indicated PUCCH resource is not within the second detection window; the UE 105 can determine a first reselected PUCCH resource for at least carrying the first HARQ-ACK, and determine a second reselected PUCCH resource for at least carrying the second HARQ-ACK. Then, the UE 105 can transmit the first HARQ-ACK on the first reselected PUCCH resource, and transmit the second HARQ-ACK on the second reselected PUCCH resource in the same slot. Wherein the reselected PUCCH resource is in PUCCH format 1, PUCCH format 3, or PUCCH format 4 and is in the same PUCCH resource set as the second indicated PUCCH resource.

Accordingly, on the TRP side, each TRP 103 can firstly detect the HARQ-ACK on the indicated PUCCH resource. In the case that no HARQ-ACK being detected on the indicated PUCCH resource, the TRP 103 can detect the HARQ-ACK on another PUCCH resource, i.e., the PUCCH resource reselected by the UE 105 within the detection window. The TRP 103 can determine another PUCCH resource to be detected based on the same rules by which the UE 105 used to determine the reselected PUCCH resource.

Figure 8:
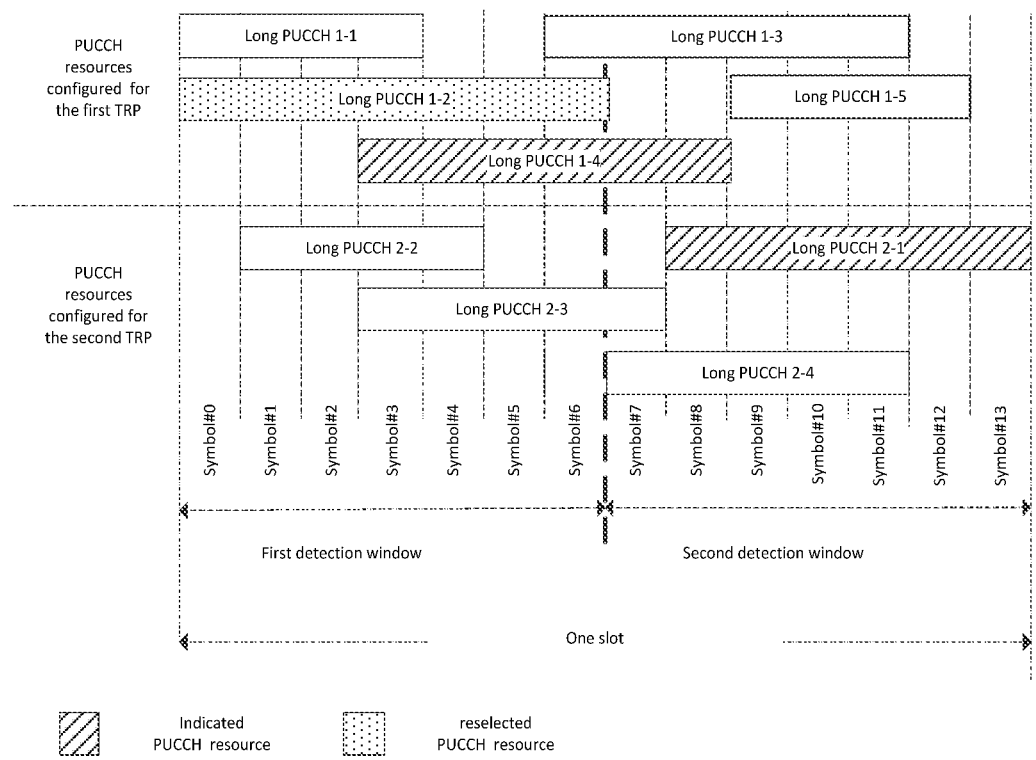
FIG. 8 illustrates an example of PUCCH reselection for HARQ-ACK feedback in multi-TRP transmission in an exemplary scenario with two indicated PUCCH resources in PUCCH format 1, PUCCH format 3 or PUCCH format 4 according an embodiment the present application.

An exemplary embodiment of the method shown in FIG. 7 can be illustrated in view of FIG. 8. FIG. 8 illustrates an example of PUCCH reselection for HARQ-ACK feedback in multi-TRP transmission in an exemplary scenario with both two indicated PUCCH resources in format 1, 3, or 4 according to an embodiment the present application.

As shown in FIG. 8, five long PUCCH resources, i.e., long PUCCH 1-1, long PUCCH 1-2, long PUCCH 1-3, long PUCCH 1-4 and long PUCCH 1-5 can be configured for the first TRP 103a. Two long PUCCH resources, i.e., long PUCCH 1-1 and long PUCCH 1-2 are in the detection window of the first TRP 103, which are first 7 symbols in the slot as shown. Meanwhile, the capacity of each configured PUCCH resource is larger than or equal to the information bits of the first HARQ-ACK to be transmitted to the first TRP 103a. To receive the HARQ-ACK from a UE 105, the first TRP 103a can indicate a long PUCCH resource of the configured PUCCH resources, e.g., long PUCCH 1-4 to the UE 105 via DCI.

Similarly, four long PUCCH resources, i.e., long PUCCH 2-1, long PUCCH 2-2, long PUCCH 2-3 and long PUCCH 2-4 can be configured for the second TRP 103b. Two long PUCCH resources, i.e., long PUCCH 2-1 and long PUCCH 2-4 are in the detection window of the second TRP 103b, which is last 7 symbols in the slot as shown. Meanwhile, the capacity of each configured PUCCH resource is larger than or equal to the information bits of the second HARQ-ACK intended for the second TRP 103b. For example, to at least receive the HARQ-ACK from a UE 105, the second TRP 103b can indicate a long PUCCH resource, e.g., long PUCCH 2-1 to the UE 105 via DCI.

Based on the received information, the UE 105 can determine that the indicated long PUCCH 1-4 for carrying the first HARQ-ACK and long PUCCH 2-1 for carrying the second HARQ-ACK are overlapped in a slot. Then, the UE 105 can determine that the second indicated PUCCH resource is within the second detection window, while the first indicated PUCCH resource is not within the first detection window. The UE 105 will reselect another long PUCCH resource in the first 7 symbols of the slot for carrying the first HARQ-ACK. The capacity of the reselected long PUCCH resource should be larger than or equal to the information bits of the first HARQ-ACK. Both long PUCCH 1-1 and long PUCCH 1-2 are in the first 7 symbols and both the capacity of them are larger than or equal to the information bits of the first HARQ-ACK. Moreover, long PUCCH 1-1 and long PUCCH 1-2 have the same start symbol. Considering the duration of long PUCCH 1-2 being longer than long PUCCH 1-1, the UE 105 will determine long PUCCH 1-2 being the reselected PUCCH resource at least for carrying the first HARQ-ACK. Then, the UE 105 can transmit the first HARQ-ACK on reselected long PUCCH 1-2 and transmit the second HARQ-ACK on indicated long PUCCH 2-1 in a single slot.

Accordingly, both the first TRP 103a and the second TRP 103b indicating a long PUCCH resource will first attempt to detect HARQ-ACK on the indicated PUCCH resource. Due to no HARQ-ACK being detected on the indicated PUCCH resource, the first TRP 103a will detect HARQ-ACK on another long PUCCH resource. According to the same rule as used by UE 105 for reselecting the PUCCH resource, the first TRP 103a can identify another long PUCCH resource to be a long PUCCH 1-2 resource used for transmission of the second HARQ-ACK and then detect the second HARQ-ACK on long PUCCH 1-2.

In some embodiments of the present application, although both indicated PUCCH resource are long PUCCH resources, the UE 105 may reselect a short PUCCH resource to replace the indicated long PUCCH resource even though the two indicated long PUCCH resources are not overlapped. In this case, each PUCCH set configured for the UE 105 can have at least one PUCCH resource in PUCCH format 0 or PUCCH format 2, and having the maximum capacity within the corresponding detection window.

Figure 9:
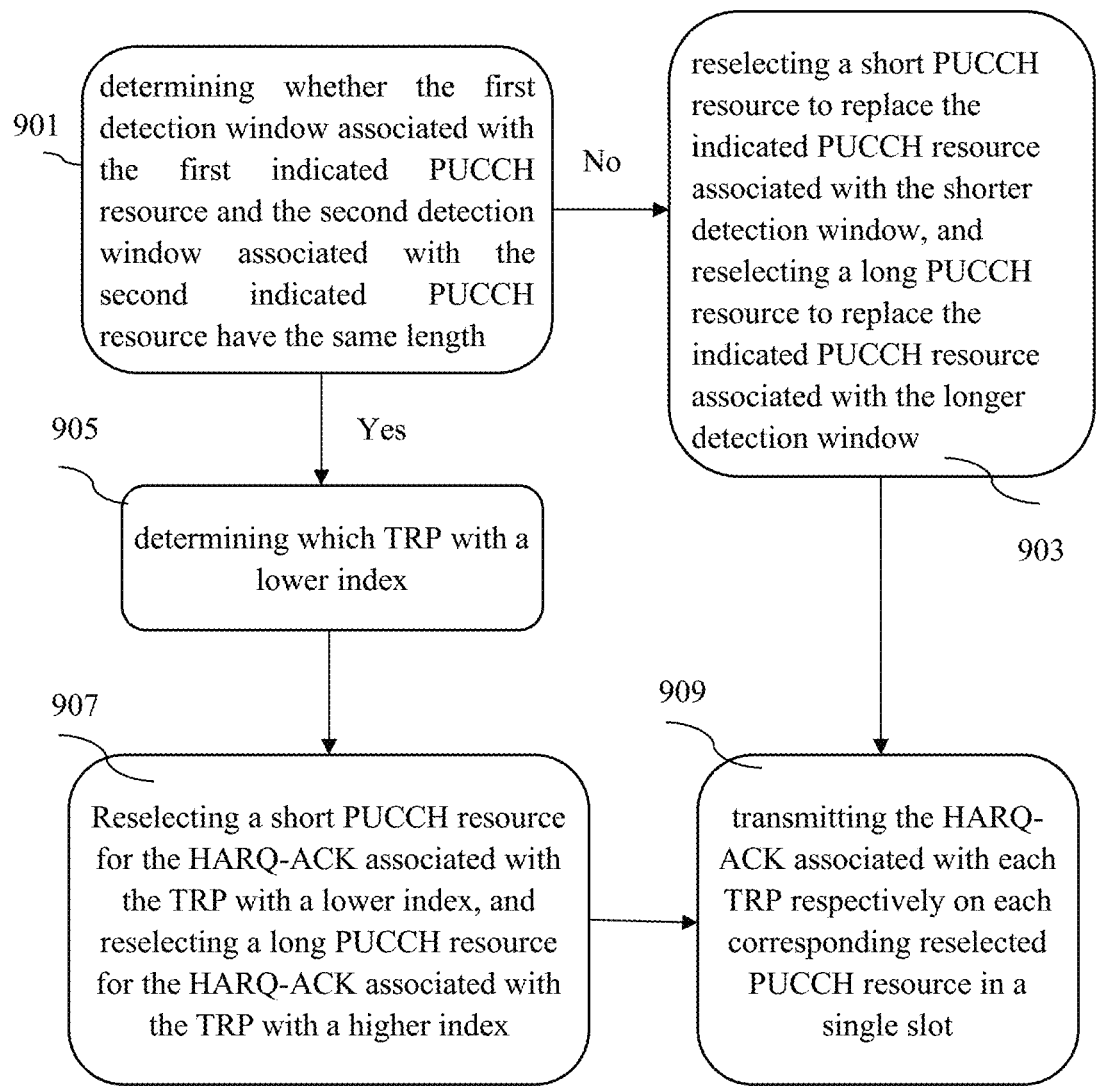
FIG. 9 is a flow chart illustrating a method for HARQ-ACK feedback in multi-TRP in the case that two indicated PUCCH resources are in PUCCH format 1, PUCCH format 3 or PUCCH format 4 according to some other embodiments of the present application.

FIG. 9 is a flow chart illustrating a method for HARQ-ACK feedback in multi-TRP scenario in the case that both indicated PUCCH resources are in PUCCH format 1, 3, or 4 according to some other embodiments of the present application. Although FIG. 9 is illustrated in view of the scenario shown in FIG. 2, it can be adaptive to other scenarios according to embodiments of the present application.

As shown in FIG. 9, in the case that the UE 105 determines that both the first and second indicated PUCCH resources are in PUCCH format 1, 3, or 4, whether the first detection window associated with the first indicated PUCCH resource and the second detection window associated with the second indicated PUCCH resource have the same length can be determined in step 901, for example by the UE 105. In the case that the first and second detection window do not have the same long, a short PUCCH resource can be reselected to replace the indicated PUCCH resource associated with the shorter detection window, while a long PUCCH resource can be reselected to replace the indicated PUCCH resource associated with the longer detection window in step 903.

In the case that the first and second detection window have the same length, which TRP 103 with a lower index can be determined, for example, in step 905. A short PUCCH resource can be reselected for the HARQ-ACK feedback associated with the TRP 103 with a lower index, while a long PUCCH resource can be reselected for the HARQ-ACK feedback associated with the TRP 103 with a higher index in step 907.

Then, in step 909, UE 105 can transmit the HARQ-ACK associated with each TRP 103 respectively on each corresponding reselected PUCCH resource in a single slot.

Except for the PUCCH format, the reselected short PUCCH resource and reselected long PUCCH resource can be determined based on the substantially same reselection rules. According to some embodiments of the present application, the reselected short or long PUCCH resource is in the same PUCCH resource set as the corresponding indicated PUCCH resource, and the capacity of the reselected short or long PUCCH resource is larger than or equal to the information bits of the HARQ-ACK to be transmitted. In the case that the same PUCCH resource set includes a plurality of PUCCH resources satisfying the above conditions, that is, in the case that a plurality of PUCCH resources within the same PUCCH resource set have a capacity larger than or equal to the information bits of the associated HARQ-ACK and are within the detection window; the earliest start symbol of the plurality of PUCCH resources can be selected by the UE 105 to transmit the associated HARQ-ACK. In the case that more than one of the plurality of PUCCH resources have the earliest start symbol, a PUCCH resource with the earliest start symbol and longest duration of the plurality of PUCCH resources can be determined being the reselected PUCCH resource.

According to some other embodiments of the present application, the capacity of the reselected PUCCH resource can be required based on that of the associated indicated PUCCH resource, rather than the information bits of the associated HARQ-ACK. Specifically, the reselected PUCCH resource is in the same PUCCH resource set as the corresponding indicated PUCCH resource, and the capacity of the reselected PUCCH resource is larger than or equal to that of the associated indicated PUCCH resource. In the case that the same PUCCH resource set includes a plurality of PUCCH resources satisfying the above conditions, that is, in the case that a plurality of PUCCH resources in the same PUCCH resource set have a capacity larger than or equal to that of the associated indicated PUCCH resource and are within the detection window; the earliest start symbol of the plurality of PUCCH resources can be selected by the UE 105 to transmit the associated HARQ-ACK. In the case that more than one of the plurality of PUCCH resources have the earliest start symbol, a PUCCH resource with the earliest start symbol and longest duration of the plurality of PUCCH resources can be determined being the reselected PUCCH resource.

Accordingly, on the TRP side, both TRPs 103 will detect the HARQ-ACK on another PUCCH resource, i.e., the PUCCH resource reselected by the UE 105 within the corresponding detection window. The TRP 103 can determine another PUCCH resource to be detected based on the same rules by which the UE 105 used to determine the reselected PUCCH resource.

Figure 10:
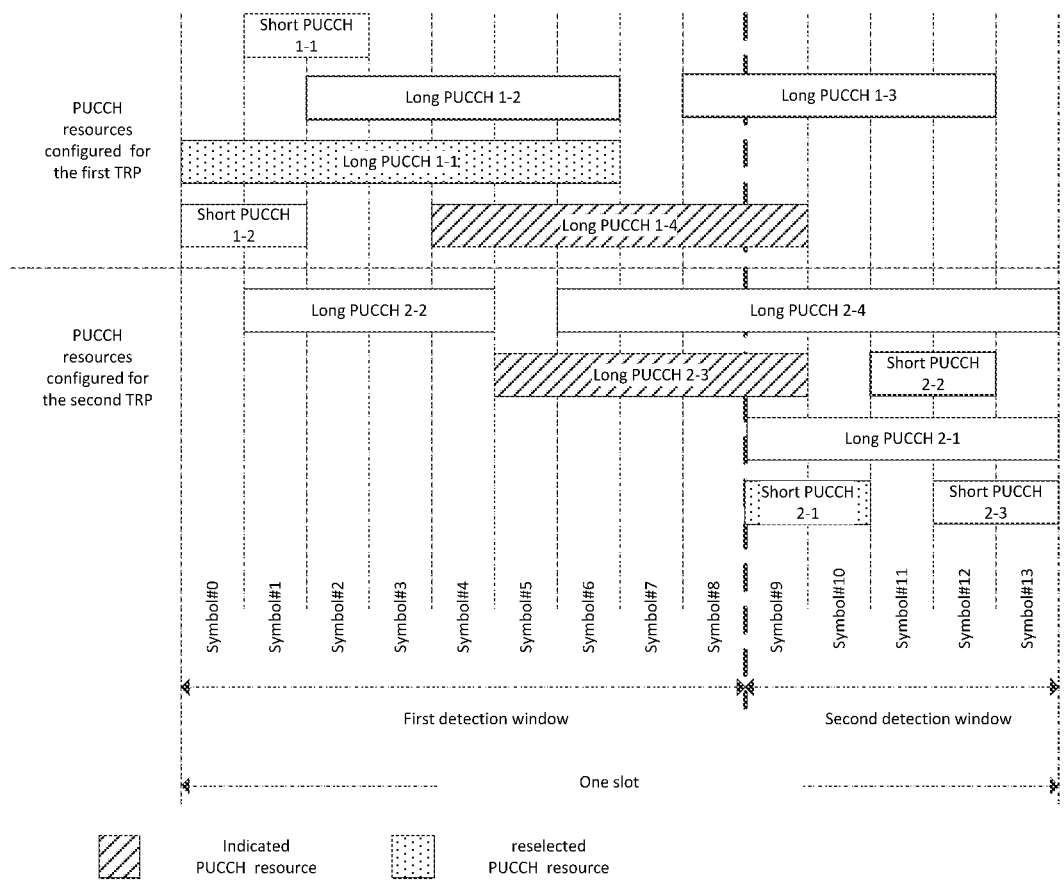
FIG. 10 illustrates an example of PUCCH reselection for HARQ-ACK feedback in multi-TRP transmission in an exemplary scenario with two indicated PUCCH resources in PUCCH format 1, PUCCH format 3 or PUCCH format 4 according another embodiment the present application.

An exemplary embodiment of the method shown in FIG. 9 can be illustrated in view of FIG. 10. FIG. 10 illustrates an example of PUCCH reselection HARQ-ACK feedback in multi-TRP transmission in an exemplary scenario with both indicated PUCCH resources being in format 1, 3, or 4 according another embodiment the present application.

As shown in FIG. 10, four long PUCCH resources, i.e., long PUCCH 1-1, long PUCCH 1-2, long PUCCH 1-3 and long PUCCH 1-4 can be configured for the first TRP 103*a*. At the same time, at least one short PUCCH resource, i.e., short PUCCH 1-1 and short PUCCH 1-2 can also be configured for the first TRP 103*a*. Two long PUCCH resources, i.e., long PUCCH 1-1 and long PUCCH 1-2, and all short PUCCH resource, i.e., short PUCCH 1-1 and short PUCCH 1-2 are within the detection window of the first TRP 103, which are first 9 symbols in the slot as shown. Meanwhile, the capacity of each configured PUCCH resource is larger than or equal to the information bits of the first HARQ-ACK targeting the first TRP 103*a*. For at least receiving the HARQ-ACK from a UE 105, the first TRP 103*a* can indicate a long PUCCH resource, e.g., long PUCCH 1-4 to the UE 105 via DCI.

Similarly, four long PUCCH resources, i.e., long PUCCH 2-1, long PUCCH 2-2, long PUCCH 2-3 and long PUCCH 2-4 can be configured for the second TRP 103*b*. At least one of short PUCCH resources, i.e. short PUCCH 2-1, short PUCCH 2-2 or short PUCCH 2-3, can also be configured for the second TRP 103*b*. Only long PUCCH 1-1 resource and all short PUCCH resources, i.e. short PUCCH 2-1, short PUCCH 2-2 and short PUCCH 2-3, are within the detection window of the second TRP 103, which is the last 5 symbols in the slot as shown. Meanwhile, the capacity of each configured PUCCH resource is larger than or equal to the information bits of the second HARQ-ACK targeting the second TRP 103*b*. For at least receiving the HARQ-ACK from a UE 105, the second TRP 103*b* can indicate a long PUCCH resource, e.g., long PUCCH 2-3 to the UE 105 via DCI.

Since the first detection window consists of the first 9 symbols in a slot and the second detection window is the last 5 symbols in the slot, UE 105 can determine that the second detection window associated with the second indicated PUCCH resource is shorter than the first detection window associated with the first indicated PUCCH resource. The UE 105 will select a short PUCCH resource, i.e., a second reselected PUCCH resource for at least carrying the second HARQ-ACK, and select a long PUCCH resource, i.e., a first reselected PUCCH resource for carrying the first HARQ-ACK. Specifically, for the first reselected PUCCH resource, both long PUCCH 1-1 and long PUCCH 1-2 have a capacity larger than or equal to the information bits of the first HARQ-ACK and are within first 9 symbols in the slot. Considering that long PUCCH 1-1 has the earliest start symbol, the UE can identify the first reselected PUCCH source being long PUCCH 1-1. For the second reselected PUCCH resource, all the short PUCCH resources, i.e., short PUCCH 2-1, short PUCCH 2-2, and short PUCCH 2-3 have a capacity larger than or equal than the information bits of the second HARQ-ACK and are within last 5 symbols in the slot. Considering that short PUCCH 2-1 has the earliest start symbol, the UE can determine the second reselected PUCCH source being short PUCCH 2-1.

Accordingly, both the first TRP 103*a* and the second TRP 103*b* indicating a long PUCCH resource will first try to detect the HARQ-ACK on the indicated PUCCH resource. Due to no HARQ-ACK being detected on the indicated PUCCH resource, the first TRP 103*a* and the second TRP 103*b* will attempt to detect HARQ-ACK on another PUCCH resource. According to the same rule as that for determining the reselected PUCCH resource, the first TRP 103*a* can determine another PUCCH resource to be a long PUCCH 1-1 and then detect HARQ-ACK on the long PUCCH 1-1 resource. The second TRP 103*b* can identify another PUCCH resource to be a short PUCCH 2-1 resource and then detect HARQ-ACK on the short PUCCH 2-1 resource.

In some embodiments of the present application, in the case that both indicated PUCCH resource are long PUCCH resources, a UE 105 may only transmit the HARQ-ACK associated with the indicated PUCCH resource with a higher priority than the other and drop the HARQ-ACK associated with the indicated PUCCH resource with a lower priority. For example, in the case that the priority of the first indicated PUCCH resource is higher than that of the second indicated PUCCH resource, the HARQ-ACK associated with the first indicated PUCCH resource can be transmitted on the first indicated PUCCH resource, while the HARQ-ACK associated with the second indicated PUCCH resource can be dropped by the UE 105.

According to some embodiments of the present application, the priority of a PUCCH resource can be determined based on the time when a DCI indicating a PUCCH resource for at least carrying HARQ-ACK is detected, start time of a PUCCH resource, duration of a PUCCH resource, or the size of the information bits of a HARQ-ACK. Accordingly, the priority of each indicated PUCCH resource can be determined based on at least one of: the time when the indicated PUCCH resource is detected by a UE 105, the start time of a the indicated PUCCH resource, the duration of the indicated PUCCH resource, or the size of the information bits of the HARQ-ACK associated with the indicated PUCCH resource.

Figure 11:
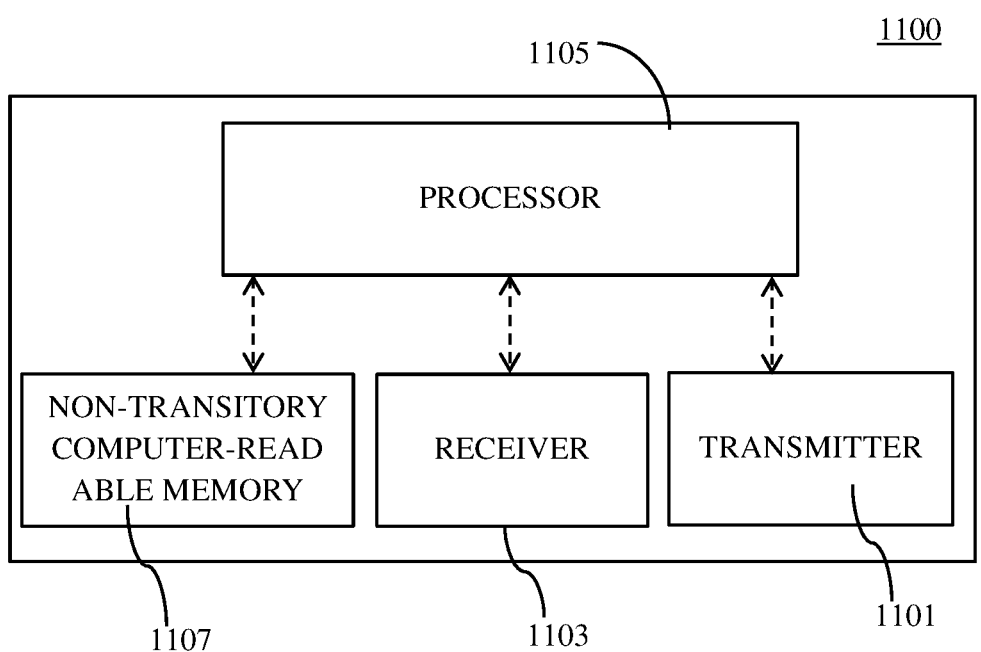
FIG. 11 illustrates a block diagram of an apparatus for HARQ-ACK feedback in multi-TRP transmission according to some embodiments of the present application.

FIG. 11 illustrates a block diagram of an apparatus 1100 for HARQ-ACK feedback in multi-TRP transmission according to some embodiments of the present application. The apparatus 1100 can be a UE 105 as shown in FIGS. 1 and 2, for example the first UE 105*a* or the second UE 105*b*.

Referring to FIG. 11, according to an embodiment of the present application, an apparatus 1100 may include at least one transmitter 1101 and at least one receiver 1103. The at least one receiver 1103 may receive information on a first indicated PUCCH resource at least for carrying a first HARQ-ACK via first DCI, and receive information on a second indicated PUCCH resource at least for carrying a second HARQ-ACK via second DCI. The at least one transmitter 1101 may transmit at least one of the first HARQ-ACK and the second HARQ-ACK.

In another embodiment of the present application, the apparatus 1100 may have an antenna (not shown), which transmits and receives radio signals. The at least one receiver 1103 and at least one transmitter 1101 can be integrated in at least one transceiver coupled with the antenna. In an embodiment of the present application, the apparatus may also include at least one processor 1105 coupled to the at least one receiver 1103 and transmitter 1101. The apparatus 1100 may also include at least one non-transitory computer-readable memory 1107, which can store computer executable instructions. The computer executable instructions can be programmed to implement a method with the at least one receiver 1101, the at least one transmitter 1103 and the at least one processor 1105 to carry out different tasks of a UE 105 in according to various embodiments of the present application.

Figure 12:
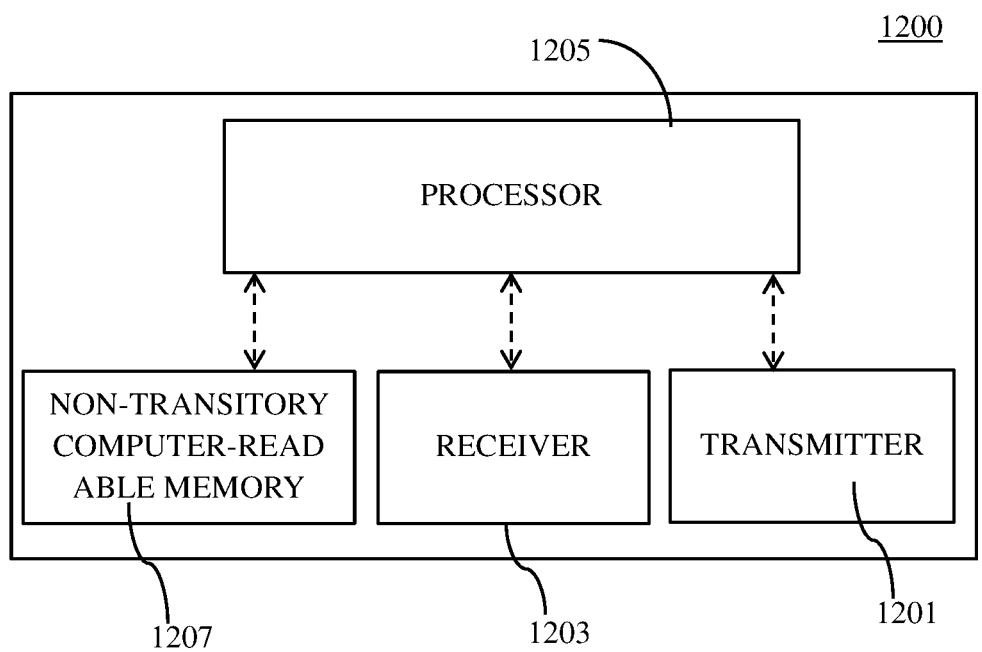
FIG. 12 illustrates a block diagram of an apparatus for HARQ-ACK feedback in multi-TRP transmission according to some other embodiments of the present application.

FIG. 12 illustrates a block diagram of an apparatus 1200 for HARQ-ACK feedback in multi-TRP transmission according to some other embodiments of the present application. The apparatus 1200 can be a TRP 103 as shown in FIGS. 1 and 2, for example the first TRP 103*a* or the second TRP 103*b*.

Referring to FIG. 12, according to an embodiment of the present application, an apparatus 1200 may include at least one transmitter 1201 and at least one receiver 1203. The at least one transmitter 1201 may transmit configuration information indicating at least one PUCCH resource set, and indicate a PUCCH resource of the at least one PUCCH resource set via DCI, wherein the indicated PUCCH resource is at least for carrying HARQ-ACK from a UE 105. The at least one receiver 1203 can receive the HARQ-ACK from the UE 105 so that the apparatus 1200 can detect the HARQ-ACK at least on the indicated PUCCH resource.

In another embodiment of the present application, the apparatus 1200 may have an antenna (not shown), which transmits and receives radio signals. The at least one receiver 1203 and at least one transmitter 1201 can be integrated in at least one transceiver coupled with the antenna. In an embodiment of the present application, the apparatus may also include at least one processor 1205 coupled to the at least one receiver 1203 and transmitter 1201. The apparatus 1200 may also include at least one non-transitory computer-readable memory 1207, which can store computer executable instructions. The computer executable instructions can be programmed to implement a method with the at least one receiver 1201, the at least one transmitter 1203 and the at least one processor 1205 to carry out different tasks of a TRP 103 in according to various embodiments of the present application.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A method at a base station, the method comprising:
 transmitting configuration information indicating at least one physical uplink control channel (PUCCH) resource set;
 indicating a first PUCCH resource of the at least one PUCCH resource set and a second PUCCH resource of the at least one PUCCH resource set_via downlink control information (DCI), wherein the indicated first PUCCH resource and the indicated second PUCCH resource are at least for carrying a hybrid automatic repeat request-acknowledge (HARQ-ACK); and
 detecting the HARQ-ACK at least on the indicated first PUCCH resource, wherein the configuration information further indicates:
  a first detection window associated with a first HARQ-ACK; and
  a second detection window associated with a second HARQ-ACK, wherein one of the first and second detection windows is N1 symbols in a slot and the other of the first and second detection windows is N2 symbols in the same slot, N1 and N2 are larger than one and smaller than a total number of symbols in the same slot, and the first detection window and the second detection window are not overlapped in time domain.

2. The method of claim 1, further comprising detecting the HARQ-ACK only on the indicated PUCCH resource in the case that the indicated PUCCH resource is in PUCCH format 0 or PUCCH format 2 within a detection window for HARQ-ACK detection, wherein the detection window is N symbols in a slot, and N is larger than one and smaller than a total number of the symbols in the slot.

3. The method of claim 1, wherein in the case that the indicated PUCCH resource is in PUCCH format 1, PUCCH format 3, or PUCCH format 4, the method comprises:
  detecting the HARQ-ACK on another PUCCH resource within the detection window in response to no HARQ-ACK being detected on the indicated PUCCH resource, wherein the another PUCCH resource is in the indicated PUCCH resource set, and a capacity of the another PUCCH resource is larger than or equal to the information bits of the HARQ-ACK.

4. The method of claim 1, wherein detecting the HARQ-ACK on another PUCCH resource comprises:
  determining the another PUCCH resource being with the earliest start symbol of a plurality of PUCCH resources in the indicated PUCCH resource set in response to that each of the plurality of PUCCH resources has a capacity larger than or equal to the information bits of the HARQ-ACK and is within the detection window.

5. A method performed by a user equipment (UE), the method comprising:
  receiving information on a first indicated physical uplink control channel (PUCCH) resource at least for carrying a first hybrid automatic repeat request-acknowledge (HARQ-ACK) via first downlink control information (DCI);
  receiving information on a second indicated PUCCH resource at least for carrying a second HARQ-ACK via second DCI;
  transmitting at least one of the first HARQ-ACK and the second HARQ-ACK; and
  receiving configuration via at least one high layer signaling indicating:
    at least one PUCCH resource set including the first indicated PUCCH resource and the second indicated PUCCH resource;
    a first detection window associated with the first HARQ-ACK; and
    a second detection window associated with the second HARQ-ACK, wherein one of the first and second detection windows is N1 symbols in a slot and the other of the first and second detection windows is N2 symbols in the same slot, N1 and N2 are larger than one and smaller than a total number of symbols in the same slot, and the first detection window and the second detection window are not overlapped in time domain.

6. The method of claim 5, wherein a first indicated PUCCH resource set including the first indicated PUCCH resource comprises at least one first PUCCH resource having the maximum capacity within the first detection window, and a second indicated PUCCH resource set including the second indicated PUCCH resource comprises at least one second PUCCH resource having the maximum capacity within the second detection window.

7. The method of claim 6, wherein the first indicated PUCCH resource is in PUCCH format 0 or PUCCH format 2, and the second indicated PUCCH resource and the at least one second PUCCH resource are in PUCCH format 1, PUCCH format 3, or PUCCH format 4, wherein the method further comprises transmitting the first HARQ-ACK on the first indicated PUCCH resource and the second HARQ-ACK on the second indicated PUCCH resource in the slot, in response to that the first indicated PUCCH resource and the second indicated PUCCH resource are not overlapped in the time domain.

8. The method of claim 7, comprising:
  transmitting the second HARQ-ACK on another PUCCH resource within the second detection window in response to that the first indicated PUCCH resource and the second indicated PUCCH resource are overlapped in the time domain, wherein the another PUCCH resource is in the second indicated PUCCH resource set, and the capacity of the another PUCCH resource is larger than the information bits of the second HARQ-ACK.

9. The method of claim 8, wherein transmitting the second HARQ-ACK on another PUCCH resource comprising:
  determining the another PUCCH resource being in PUCCH format 1, PUCCH format 3, or PUCCH format 4; and
  determining the another PUCCH resource being with the earliest start symbol of a plurality of PUCCH resources in the second indicated PUCCH resource set in response to that each of the plurality of PUCCH resources has a capacity larger than or equal to the information bits of the second HARQ-ACK and is within the second detection window.

10. The method of claim 6, wherein the first indicated PUCCH resource, the at least one first PUCCH resource, the at least one second indicated PUCCH resource and the at least one second PUCCH resource are in PUCCH format 1, PUCCH format 3, or PUCCH format 4.

11. The method of claim 10, comprising transmitting both the first HARQ-ACK on the first indicated PUCCH resource and the second HARQ-ACK on the second indicated PUCCH resource in the slot, in response to that the first indicated PUCCH resource and the second indicated PUCCH resource are not overlapped in the time domain.

12. The method of claim 10, comprising: in response to that the first indicated PUCCH resource and the second indicated PUCCH resource are overlapped in the time domain, determining whether the first indicated PUCCH resource is within the first detection window or whether the second indicated PUCCH resource is within the second detection window.

13. The method of claim 12, comprising: in response to that the first indicated PUCCH resource is within the first detection window, and the second indicated PUCCH resource is not within the second detection window;
  transmitting the first HARQ-ACK on the first indicated PUCCH resource in the slot; and
  transmitting the second HARQ-ACK on another PUCCH resource with a capacity larger than or equal to the information bits of the HARQ-ACK within the second detection window in the slot, wherein the another PUCCH resource is in PUCCH format 1, PUCCH format 3, or PUCCH format 4 and is in the second indicated PUCCH resource set.

14. The method of claim 12, comprising: in response to that the first indicated PUCCH resource is not within the first detection window, and the second indicated PUCCH resource is not within the second detection window;
  transmitting the first HARQ-ACK on a first reselected PUCCH resource with a capacity larger than or equal to the information bits of the first HARQ-ACK within the first detection window in a slot; and transmitting the second HARQ-ACK on a second reselected PUCCH resource with a capacity larger than or equal to the information bits of the second HARQ-ACK within the second detection window in the slot, wherein the first and second reselected PUCCH resources are in PUCCH format 1, PUCCH format 3 or PUCCH format 4, the first reselected PUCCH resource is in the first indicated PUCCH resource set, and the reselected second PUCCH resource is in the second indicated PUCCH resource set.

15. The method of claim 10, comprising: in response to that the first detection window is shorter than the second detection window, transmitting the first HARQ-ACK on a first reselected PUCCH resource in PUCCH format 0, or PUCCH format 2 with a capacity larger than or equal to the information bits of the first HARQ-ACK within the first detection window in the slot; and transmitting the second HARQ-ACK on a second reselected PUCCH resource in PUCCH format 1, PUCCH format 3 or PUCCH format 4 with a capacity larger than or equal to the information bits of the second HARQ-ACK within the second detection window in the slot, wherein the first reselected PUCCH resource is in the first indicated PUCCH resource set, and the second reselected PUCCH resource is in the second indicated PUCCH resource set.

16. The method of claim 10, comprising: in response to that the first detection window has the same duration with the second detection window, while a transmit-receive point (TRP) associated with the first detection window has an index lower than that of the other TRP associated with the first detection window;

transmitting the first HARQ-ACK on a first reselected PUCCH resource in PUCCH format 0, or PUCCH format 2 with a capacity larger than or equal to the information bits of the first HARQ-ACK within the first detection window in the slot; and transmitting the second HARQ-ACK on a second reselected PUCCH resource in PUCCH format 1, PUCCH format 3 or PUCCH format 4 with a capacity larger than or equal to the information bits of the second HARQ-ACK within the second detection window in the slot, wherein the first reselected PUCCH resource is in the first indicated PUCCH resource set, and the second reselected PUCCH resource is in the second indicated PUCCH resource set.

17. The method of claim 6, comprising: only transmitting the HARQ-ACK associated with the one of the first indicted PUCCH resource and second indicated PUCCH resource with a priority higher than the other.

18. The method of claim 17, comprising:

determining whether the priority of the first indicated PUCCH resource is higher than that of the second indicated PUCCH resource based on at least one of the following: the time when a DCI is detected which indicated a PUCCH resource for at least carrying HARQ-ACK, a start time of a PUCCH resource, a duration of a PUCCH resource, or a size of the information bits of a HARQ-ACK.

19. A user equipment (UE), comprising:

at least one memory; and at least one processor coupled with the at least one memory and configured to cause the UE to:

receive information on a first indicated physical uplink control channel (PUCCH) resource at least for carrying a first hybrid automatic repeat request-acknowledge (HARQ-ACK) via first downlink control information (DCI);

receive information on a second indicated PUCCH resource at least for carrying a second HARQ-ACK via second DCI;

transmit at least one of the first HARQ-ACK and the second HARQ-ACK; and receive configuration via at least one high layer signaling indicating:

at least one PUCCH resource set including the first indicated PUCCH resource and the second indicated PUCCH resource;

a first detection window associated with the first HARQ-ACK; and a second detection window associated with the second HARQ-ACK, wherein one of the first and second detection windows is N1 symbols in a slot and the other of the first and second detection windows is N2 symbols in the same slot, N1 and N2 are larger than one and smaller than a total number of symbols in the same slot, and the first detection window and the second detection window are not overlapped in time domain.

* * * * *